(12) United States Patent
Couse

(10) Patent No.: US 12,081,905 B2
(45) Date of Patent: Sep. 3, 2024

(54) PHONE AS AN AUDIO OUTPUT DEVICE FOR A COMPUTING SYSTEM

(71) Applicant: MITEL NETWORKS CORPORATION, Ottawa (CA)

(72) Inventor: Peter Couse, Ottawa (CA)

(73) Assignee: Mitel Networks Corporation, Kanata (CA)

(*) Notice: Subject to any disclaimer, the term of this patent is extended or adjusted under 35 U.S.C. 154(b) by 266 days.

(21) Appl. No.: 17/665,374

(22) Filed: Feb. 4, 2022

(65) Prior Publication Data

US 2022/0256027 A1 Aug. 11, 2022

Related U.S. Application Data

(60) Provisional application No. 63/207,127, filed on Feb. 9, 2021.

(51) Int. Cl.

| | |
|---|---|
| H04N 7/15 | (2006.01) |
| H04L 65/403 | (2022.01) |
| H04M 1/72 | (2021.01) |
| H04M 1/72409 | (2021.01) |
| H04M 1/72436 | (2021.01) |
| H04M 1/72463 | (2021.01) |
| H04M 1/72484 | (2021.01) |
| H04M 3/533 | (2006.01) |
| H04N 7/14 | (2006.01) |
| H04W 4/16 | (2009.01) |

(52) U.S. Cl.
CPC ............ *H04N 7/15* (2013.01); *H04L 65/403* (2013.01); *H04M 1/72409* (2021.01); *H04M 1/72436* (2021.01); *H04M 1/72463* (2021.01); *H04M 1/72484* (2021.01); *H04M 3/53333* (2013.01); *H04N 7/14* (2013.01); *H04W 4/16* (2013.01)

(58) Field of Classification Search
None
See application file for complete search history.

(56) References Cited

U.S. PATENT DOCUMENTS

| | | | |
|---|---|---|---|
| 2002/0001302 A1 | 1/2002 | Pickett | |
| 2006/0193459 A1* | 8/2006 | Cadiz | H04M 7/006 379/211.02 |
| 2008/0200159 A1* | 8/2008 | Lai | H04M 1/6066 455/416 |
| 2009/0103457 A1 | 4/2009 | Mamakos | |
| 2014/0219132 A1 | 8/2014 | Delveaux et al. | |
| 2014/0247932 A1* | 9/2014 | Gupta | H04M 3/42365 379/201.01 |
| 2017/0171512 A1* | 6/2017 | Benzaia | H04L 65/765 |
| 2018/0285061 A1* | 10/2018 | Park | G06F 3/0488 |
| 2018/0309801 A1 | 10/2018 | Rathod | |
| 2020/0351747 A1* | 11/2020 | Verger | H04W 36/03 |

* cited by examiner

*Primary Examiner* — Quoc D Tran

(57) ABSTRACT

The technology described herein includes a method of receiving, by a phone, audio data from an application running on a computing system coupled to the phone; sending the audio data to an audio output device coupled with the phone; and detecting an incoming phone call to the phone and automatically handling the incoming phone call, based at least in part on one or more preferences of a user of the phone, while receiving the audio data from the application and sending the audio data to audio output device.

20 Claims, 7 Drawing Sheets

PHONE AS AN AUDIO OUTPUT DEVICE FOR A COMPUTING SYSTEM

CROSS-REFERENCE TO RELATED APPLICATION

This application claims the benefit of U.S. Provisional Patent Application No. 63/207,127, filed Feb. 9, 2021, which is incorporated by reference herein in its entirety.

FIELD OF THE DISCLOSURE

This disclosure relates generally to a video conferencing application in a computing system, and more particularly, to using a phone as an audio output device for a video conferencing application running on a computing system.

BACKGROUND

Recently, business organizations have allowed many workers to work from home. As a result, face-to-face collaboration is often replaced by personal computer (PC) based video collaboration solutions, such as video conferencing for home-based workers. Many of these workers also had or brought a teleworker phone home for voice communication with coworkers, customers, partners, etc. Alternatively, some workers use their personal phone for work phone calls.

Thus, these types of users (e.g., "work from home" persons) are faced with having to manage two independent audio output devices, their PC for video collaboration and their phone for voice calls. These two devices are not integrated and must be used and managed separately. This causes numerous issues. The user often needs to use a headset so as not to disturb others in the house while on a video conferencing call. However, a headset is needed for both the phone and the PC so the user must either switch a single headset back and forth (that is, unplug from one and plug into the other), use two headsets (one for each application), or ask their organization to pay for an expensive headset that has the ability to connect to both at the same time. Most organizations can't afford to equip the entire home workforce with such an expensive headset.

Another issue is that people calling the user on their phone typically have no idea that the user is currently occupied in a video conferencing session, which means the user's phone rings when phone calls come in, causing disruptions to the video conferencing session. To avoid calls ringing on the phone during video conferencing sessions, users can put their phone into "Do Not Disturb" (DND) mode, which prevents the phone from ringing. It is easy for users to forget that the phone is set to DND and therefore the phone remains in DND mode long after being needed (e.g., during the video conferencing session) and phone calls are unnecessarily missed. Some users might be able to look at the calendar of other co-workers before calling them to see if they are currently in a meeting, but this is time consuming and usually is only available for workers within the same company. Thus, external callers do not have access to the called party's calendar.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
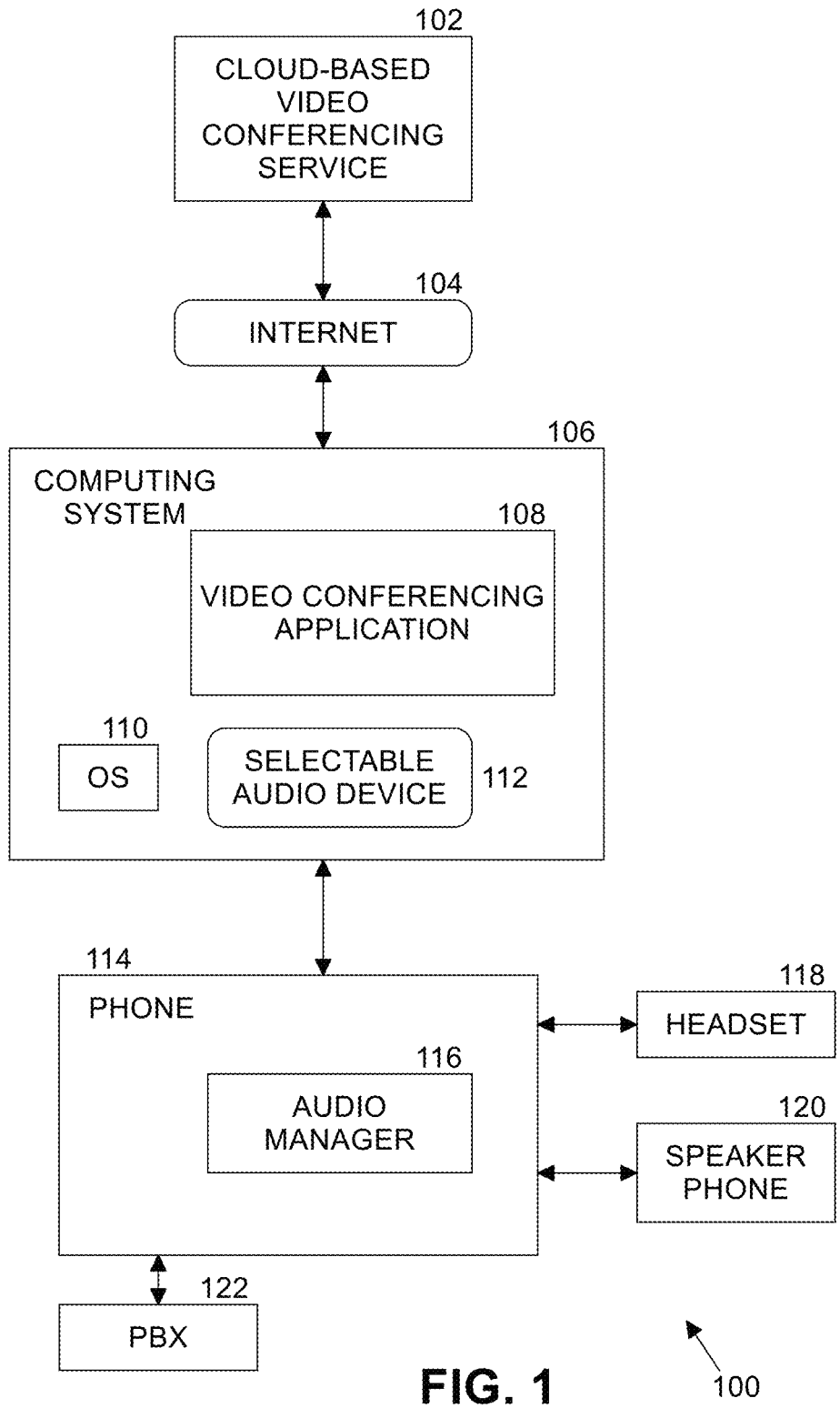
FIG. 1 illustrates an arrangement of a phone and a computing system according to one implementation.

The present disclosure relates to methods, apparatus, systems, and non-transitory computer-readable storage media for a phone to connect to a computing system (such as a PC) and then have the phone be used as the audio output device for the computing system. The user can select the phone as the audio output device to be used by a video conferencing application or service (e.g., Zoom from Zoom Video Communications, Inc., Teams from Microsoft Corporation, MiTeam® Meetings from Mitel Networks Corporation, etc.) running on the computing system. The phone is informed when the phone is being used as an audio output device by the computing system as directed by the video conferencing application and automatically manages handling of incoming phone calls based at least in part on the user's preferences while a video conferencing session is active (e.g., while receiving audio data from the video conferencing application and sending the audio data to an audio output device associated with the phone). This technology includes allowing the user to answer incoming phone calls and have the output of the audio data from the computing system by the phone be automatically put on a hold (paused) status and then resumed from the hold status when the phone call is over. This technology also allows the audio data from the computing system to be output to any audio accessory device connected to the phone. For example, the audio data can be output to a handsfree speakerphone, an attached headset, a loudspeaker, or an internal speaker in the phone's handset or base.

The technology disclosed herein allows for automated management of incoming phone calls and ringing to avoid disruptions while the user is in a video conferencing session. For example, the user can choose to have the phone automatically turn on DND or forward calls to another extension, or simply silence the ringer but allow the incoming call to appear in the phone's display. Because the phone is managing the phone's behavior while the phone is being used to output audio data from the computing system, the features will work for any computing system-based video conferencing application (e.g., the user can choose to handle incoming phone calls during a computing system-based video conferencing session or choose to automatically put the phone into DND for MiTeam® Meetings, Microsoft Team meetings, Zoom calls, or any other application session).

The phone described herein includes an audio manager to manage the capability of connecting to a computing system (e.g., a PC) and to be used as the audio output device for outputting audio data from the computing system. Once available as the audio output device for the computing system, the phone can be selected as the audio output device to use within numerous computing system-based video conferencing applications and/or as the default audio output device for the computing system. The technology provided herein further provides the user with the ability to choose how incoming phone calls are to be handled while the phone is being used for computing system audio output. This includes being able to answer incoming phone calls and have the computing system audio output be automatically placed on hold (paused), or set the phone automatically to turn on Do Not Disturb (DND), Call Forwarding (FWD), or Call Waiting (CW) tones instead of ringing, etc. Because the phone is managing this behavior, the phone can be used regardless of what application running on the computing system is using the phone as an audio output device. In one implementation, one or more of DND, call forwarding and call waiting are automatically enabled whenever a video conferencing session is active and sending audio data to the phone for output to an associated audio output device.

Further, depending on the technology used to connect the phone to the computing system, the audio manager can provide signaling to the computing system that can be used by applications to trigger application features. For example, if the phone is connected via universal serial bus (USB), the phone can use the USB human interface device (HID) protocol to indicate functions initiated on the phone to the application such as, volume up/down, mute, answer/hang up, etc. These are supported functions within HID, so for example the user could press the "hang up" key on the phone to exit the PC based video collaboration session.

This technology can aid with user issues related to use of phone calls and other computing system-based applications. For example, a music application can use the phone as the audio output device from the computing system and stream music to the phone. In this case, the phone may be set to automatically mute the music when an incoming phone call is received and then automatically unmute once the call is terminated. This allows the music audio to be moved to any audio accessory connected to the phone. For example, the audio data could be played through the phone's connected handsfree speaker but then be moved to an attached stereo headset. The phone could also be used as a microphone input to the computing system and used for applications that use speech recognition or voice annotation. Other applications and uses are contemplated.

FIG. 1 illustrates an arrangement 100 of a phone 114 and a computing system 106 according to one implementation. A cloud-based video conferencing service 102 interfaces with a network, such as the Internet 104, with a video conferencing application 108 running on a computing system 106. Alternatively, the network may be an intranet within an organization, such as a business. In another implementation, the video conferencing service 102 is based on the premises of an organization, such as a business, and provided to the employees of the business. Computing system 106 may represent any type of information processing system, such as a server, a disaggregated server, a personal computer (PC), a desktop computer, a portable computer, a set-top box, a hand-held device such as a tablet, or an embedded control system. Computing system 106 includes operating system (OS) 110 (including an OS graphical user interface (GUI)) to provide the capability for phone 114 to be a selectable audio device 112 for outputting audio data from computing system 106 by video conferencing application 108 or other applications (e.g., music applications such as Apple iTunes®, Spotify, Pandora, video applications such as YouTube, audio/video training applications, etc.). Video conferencing application 108 may use phone 114 as a selectable audio device instead of a default audio device or other selectable audio device for the computing system.

Phone 114 may be a desk phone, a desk phone supporting private branch exchange (PBX) features provided by PBX 122 (or other telephone network or service), or a smart phone. Phone 114 includes audio manager 116 to control whether phone 114 is receiving audio data from video conferencing application 108 or other applications running on computing system 106 and outputting the audio data over headset 118 or speaker phone 120 coupled to the phone, or to one or more loudspeakers (not shown) integral with phone 114 or external to the phone. Phone 114 is communicatively coupled with computing system 106 by conventional means, such as USB, Bluetooth®, WiFi, or other communications technologies. Headset 118 and/or speaker phone 120 may be coupled to phone 114 using wired (e.g., USB, RJ9 cable, 3.5 mm jack, etc.) or wireless (e.g., Bluetooth®, digital enhanced cordless communications (DECT), etc.) means. In one implementation, speaker phone 120 is simply a loudspeaker. In one implementation, phone 114 may be coupled by wired or wireless means with an on-premise PBX and/or cloud-based telecommunications service. Audio manager 116 provides a capability for the user of the phone to select various internal and/or externally connected audio devices (e.g., phone speaker, headset, speaker phone, loudspeaker, etc.) to output the audio data received from the video conferencing application 108.

In one implementation, the user of the phone 114 may choose ahead of time, using audio manager 116, preferences on how the phone should treat incoming phone calls when the user is attending a video conferencing session in video conferencing application 108. For example, the user may set the phone, using audio manager 116, to automatically enable DND status, so that no phone calls are received and/or displayed on the phone. In another example, the user may set the phone, using audio manager 116, to automatically forward incoming phone calls to a selected destination phone number or email address, so that no phone calls are received and/or displayed on the phone. In another example, the user may set the phone, using audio manager 116, to allow incoming phone calls to arrive, and play a call waiting tone (resulting in minimal audible disruption to the ongoing video conferencing session). In a further example, the user may set the phone, using audio manager 116, to allow incoming phone calls to arrive, and but to not play a call waiting tone (resulting in no audible disruption to the ongoing video conferencing session).

In one implementation, providing DND to be automatically enabled when the user enters into a video conferencing session allows others attempting to reach the user to see that the user is not available—this information would be visible on their phones or within a PBX and/or cloud-based phone application via a presence status of the person they are trying to reach. Currently there is no way for others to know that the person they are trying to reach is busy in a video conferencing session. The technology described herein provides a mechanism to communicate this status information regardless of what video conferencing service the user they are trying to reach is using.

Figure 2:
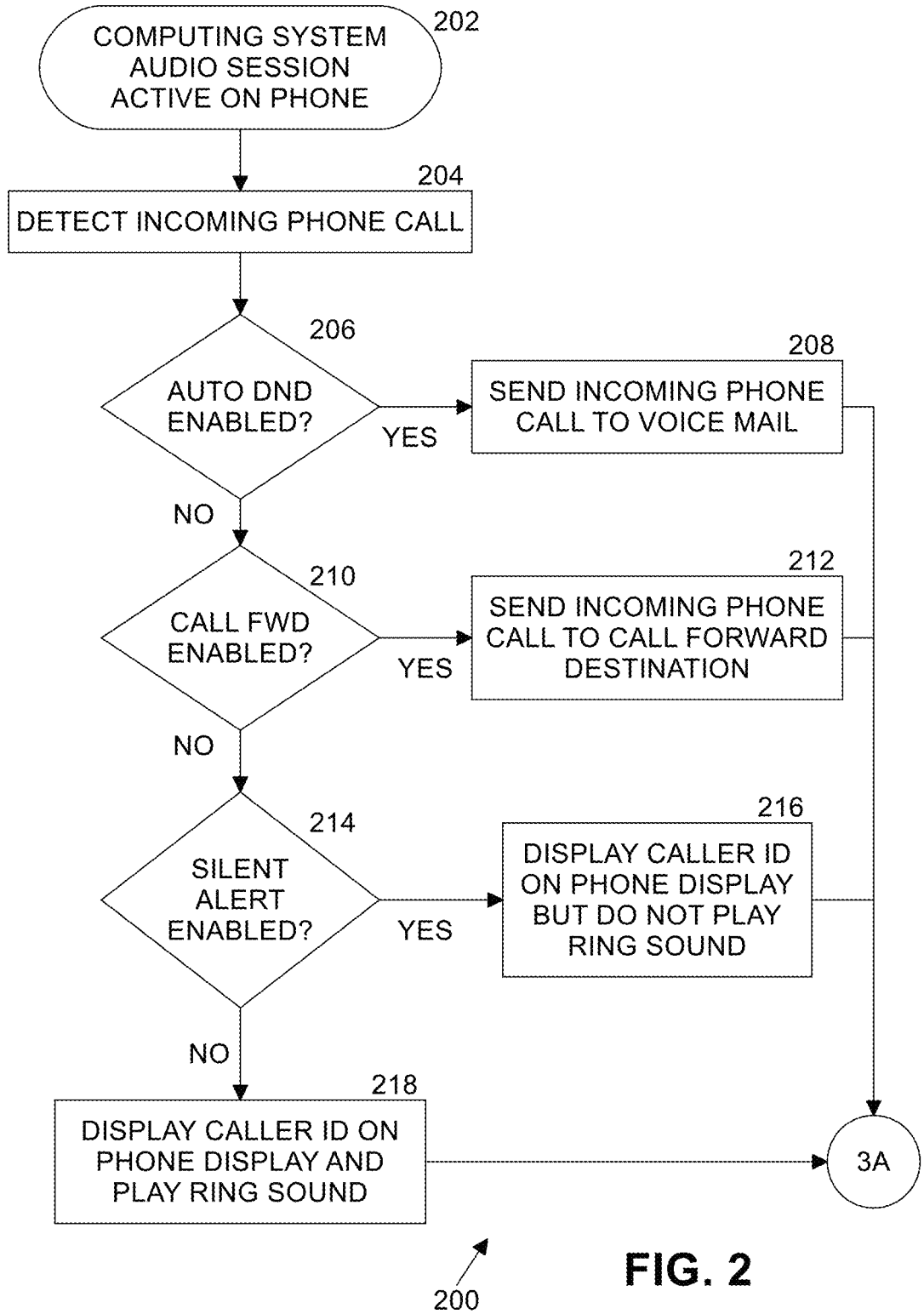
FIGS. 2 and 3 are flow diagrams illustrating handling of an incoming phone call while the phone is used as an audio output device for a video conferencing application according to one implementation.
Figure 3:
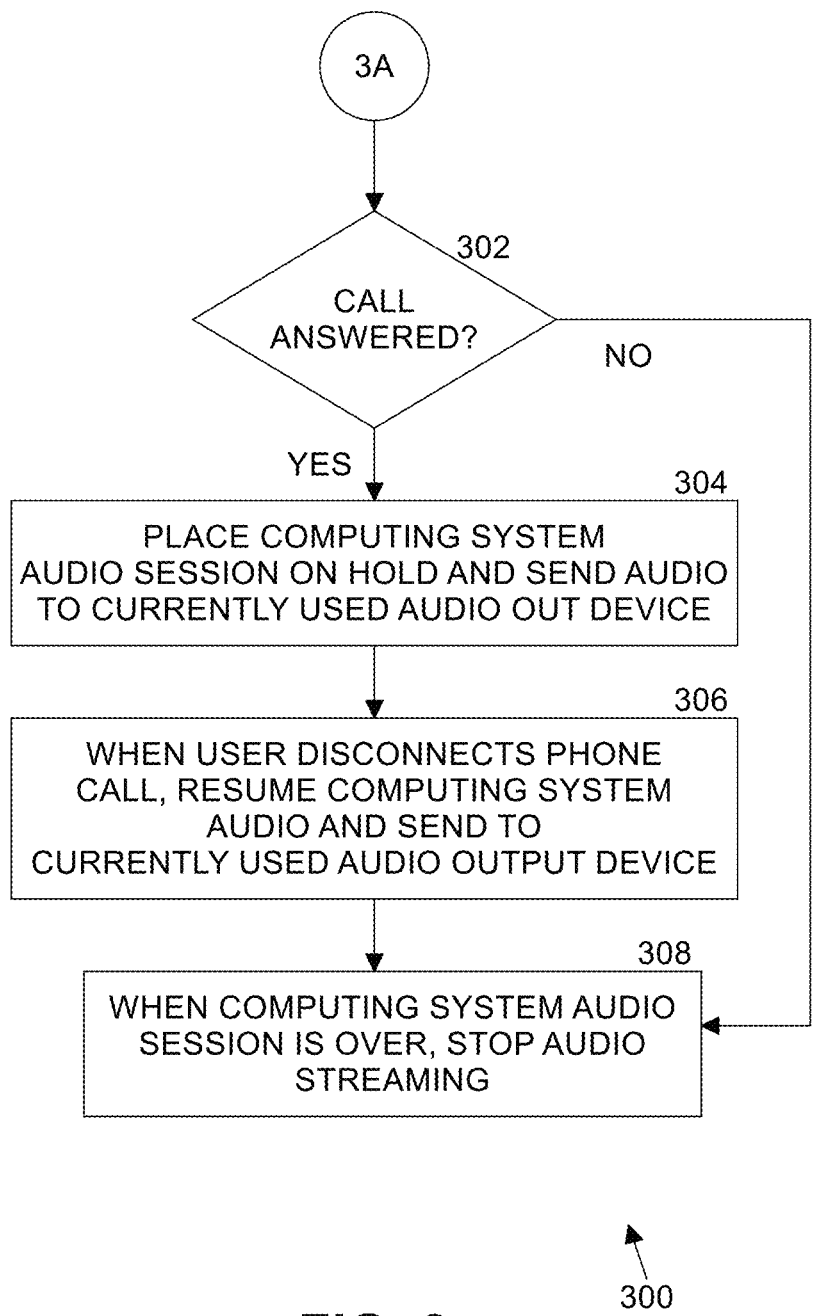

FIGS. 2 and 3 are flow diagrams illustrating handling of an incoming phone call while the phone is used as an audio output device for a video conferencing application according to one implementation. When video conferencing application 108 or other application running on computing system 106 selects phone 114 as a selectable audio device 112, audio manager 116 of phone 114 updates a status indicating that a computing system audio session is active. In one implementation, the video conferencing application 108 selects the phone as the audio output device for the computing system 106. In another implementation, a user of the phone and the computing system interfaces with OS 110 to select the phone as the audio output device for the computing system. In either case, computing system 106 notifies phone 114 of the selection of the phone as an audio output device and/or session activation. When the computing system audio session is active at block 202, phone 114 outputs audio data received from computing system 106 to a currently active audio output device (e.g., an internal speaker, a coupled headset, a coupled speaker phone, a coupled loudspeaker, etc.).

At block 204, phone 114 detects an incoming call. If automatic DND is enabled at block 206, then audio manager 116 directs PBX 122 (or other telephone network or service) to send the incoming phone call to voice mail or another action (such as call forwarding to another phone, depending on user preferences set up in PBX 122). In one implementation, DND is automatically enabled when the computing system audio session is activated, and automatically disabled when the computing system audio session is deactivated (e.g., when the video conferencing session is over). Processing continues at block 302 of FIG. 3 via connector 3A. If automatic DND is disabled at block 206, processing continues with block 210. At block 210, if call forwarding is enabled, then audio manager 116 sends the incoming phone call to a designated call forward destination at block 212. The destination may be a phone number or an email address. In one implementation, call forwarding is automatically enabled when the computing system audio session is activated, and automatically disabled when the computing system audio session is deactivated (e.g., when the video conferencing session is over). Processing continues at block 302 of FIG. 3 via connector 3A. If call forwarding is disabled at block 210, processing continues with block 214. At block 214, if silent alert is enabled, then at block 216 audio manager 116 displays the caller identification (ID) of a caller of the incoming phone call on the phone display but phone 114 does not play a ring sound to indicate an incoming phone call. In one implementation, silent alert is automatically enabled when the computing system audio session is activated, and automatically disabled when the computing system audio session is deactivated (e.g., when the video conferencing session is over). Processing continues at block 302 of FIG. 3 via connector 3A. If silent alert is disabled at block 214, then at block 218 audio manager 116 displays the caller ID on the phone display and phone 114 does play a ring sound to indicate an incoming phone call. Processing continues at block 302 of FIG. 3 via connector 3A.

In one implementation, if silent alert is enabled and an instant message (IM) (text message) is received, audio manager 116 may handle the arrival of the IM from a sender in manner similar to an incoming phone call (thereby also preventing an incoming text sound from disrupting the video conferencing session).

Continuing at block 302 of FIG. 3 via connector 3A, if the incoming phone call is answered by the user, then at block 304 audio manager 116 places the active computing system audio session on hold (e.g., paused, temporarily inactive) and sends any audio for the phone (e.g., the voice call) to the currently used audio output device (e.g., internal speaker, headset, speaker phone, external loudspeaker, etc.). In one implementation, while the call is being handled, audio from the video conferencing application or other application is still being generated and sent to the phone, but the phone ignores this audio data (e.g., the phone "mutes" the output of this audio data). Alternatively, the audio manager may signal to the video conferencing application or other application to discontinue sending the audio data to the phone until the call is disconnected. Next, at block 306, when the user disconnects the phone call, audio manager 116 resumes the previously active computing system audio session (e.g., makes the session active again) and sends any audio data received from the computing system from that point onward to the currently used audio output device. At block 308, when the computing system audio session is over (e.g., when the video conference session is completed), phone 114 stops streaming the audio data received from the computing system to the currently used audio output device.

In the detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The detailed description is, therefore, provided to describe example implementations and not to be taken as limiting on the scope of the subject matter described in this disclosure. Certain features from different aspects of the description may be combined to form yet new aspects of the subject matter discussed below.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real-world imperfections.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

While an example manner of implementing the computing arrangement 100 of FIG. 1 is illustrated herein, one or more of the elements, processes, and/or devices illustrated in FIG. 1 may be combined, divided, re-arranged, omitted, eliminated, and/or implemented in any other way. Further, the example computing arrangement 100 circuitry (including one or more of computing system 106 and phone 114) may be implemented by hardware, software, firmware, and/or any combination of hardware, software, and/or firmware. Thus, for example, any of the example computing arrangement 100 circuitry could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example computing system circuitry is/are hereby expressly defined to include a non-transitory computer readable storage device or storage disk such as a memory, a digital versatile disk (DVD), a compact disk (CD), a Blu-ray disk, etc., including the software and/or firmware. Further still, the example computing system and/or phone 114 of FIG. 1 may include one or more elements, processes, and/or devices in addition to, or instead of, those illustrated in FIG. 1, and/or may include more than one of any or all of the illustrated elements, processes and devices.

A flow chart representative of example hardware logic circuitry, machine readable instructions, hardware implemented state machines, and/or any combination thereof for implementing the computing arrangement 100 (including phone 114 and/or audio manager 116) of FIG. 1 is shown in FIGS. 2 and 3. The machine readable instructions may be one or more executable programs or portion(s) of an executable program for execution by processor circuitry, such as the processor circuitry 812 shown in the example processor platform 800 discussed below in connection with FIG. 4 and/or the example processor circuitry discussed below in connection with FIGS. 5 and/or 6. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 2 and 3, many other methods of implementing the example computing arrangement 100 (including phone 114 and/or audio manager 116) may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine readable media, as used herein, may include machine readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 2 and 3 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 4:
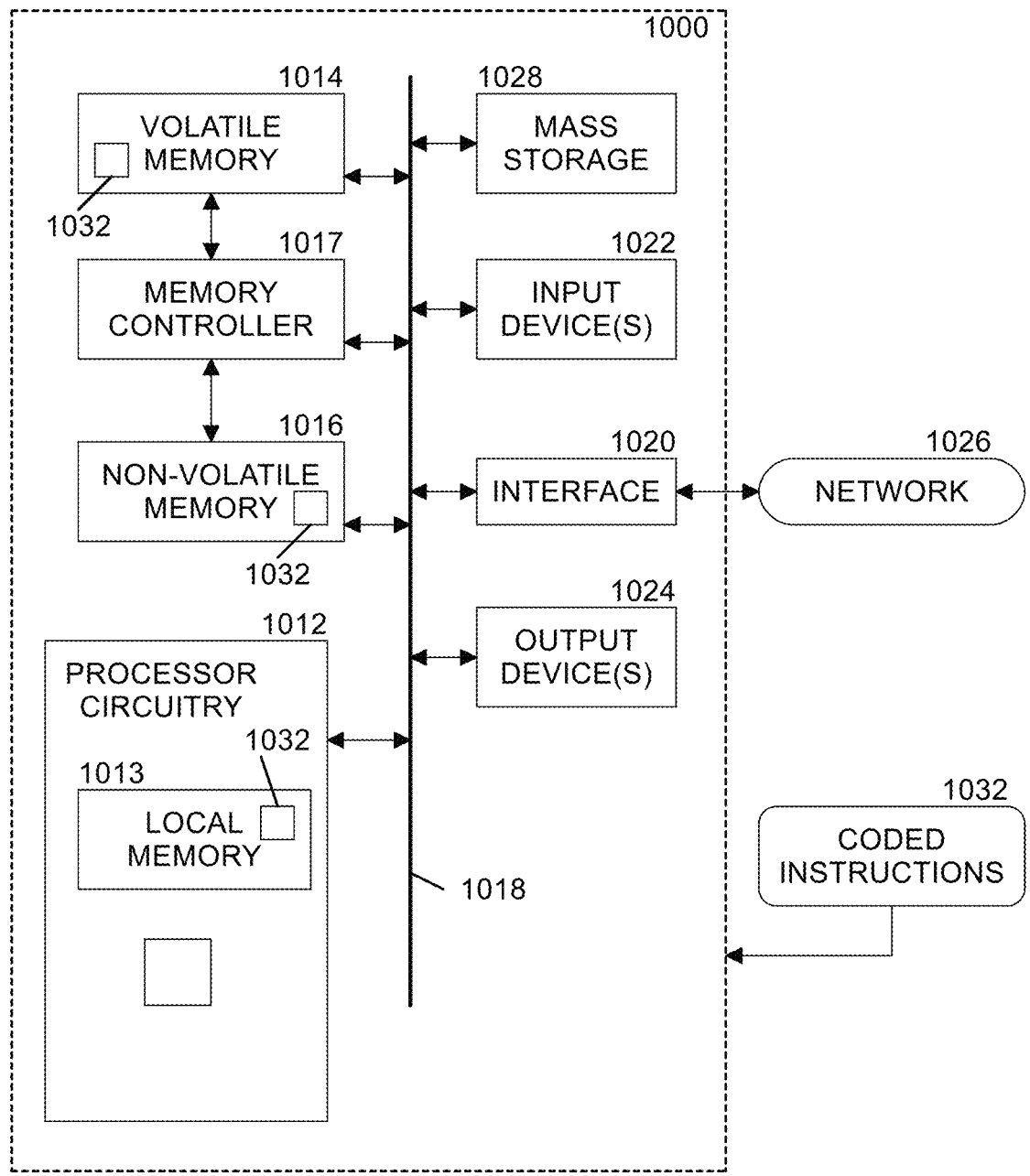
FIG. 4 is a block diagram of an example processor platform structured to execute and/or instantiate the machine-readable instructions and/or operations of FIGS. 2 and 3 to implement the apparatus discussed with reference to FIG. 1.

FIG. 4 is a block diagram of an example processor platform 1000 structured to execute and/or instantiate the machine-readable instructions and/or operations of FIGS. 2 and 3 to implement at least one component of the computing arrangement of FIG. 1 (e.g., phone 114 and/or audio manager 116). The processor platform 1000 can be, for example, a phone 114, a SOC, a server, a computing system 106, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs microprocessors, CPUs, GPUs, DSPs, and/or microcontrollers from any desired family or manufacturer. The processor circuitry 1012 may be implemented by one or more semiconductor based (e.g., silicon based) devices.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random-Access Memory (SDRAM), Dynamic Random-Access Memory (DRAM), RAIVIBUS® Dynamic Random-Access Memory (RDRAM®), and/or any other type of RAM device. The non-volatile memory 1016 may be implemented by flash memory and/or any other desired type of memory device. Access to the volatile memory 1014 and/or non-volatile 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a trackpad, a trackball, an iso-point device, and/or a voice recognition system.

One or more output devices 1024 are also connected to the interface circuitry 1020 of the illustrated example. The output devices 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 10210 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine-readable instructions 1032 may be stored in the mass storage device 1028, in the volatile memory 1014, in the non-volatile memory 1016, and/or on a removable non-transitory computer readable storage medium such as a CD or DVD.

Figure 5:
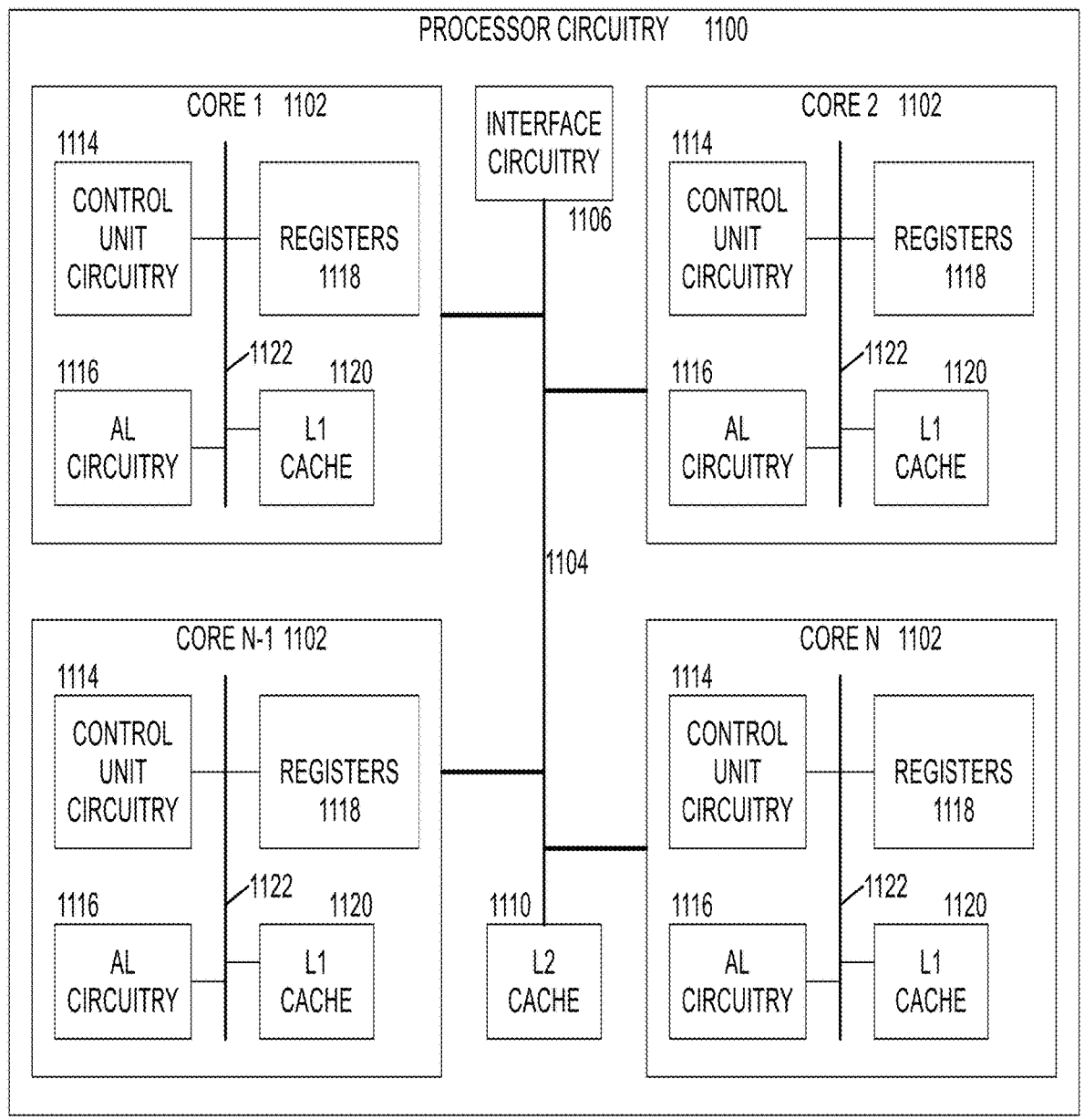
FIG. 5 is a block diagram of an example implementation of the processor circuitry of FIG. 4.

FIG. 5 is a block diagram of an example implementation of the processor circuitry 1012 of FIG. 4. In this example, the processor circuitry 1012 of FIG. 4 is implemented by processor circuitry 1100 (e.g., a microprocessor). For example, the processor circuitry 1100 may implement multi-core hardware circuitry such as a CPU, a DSP, a GPU, an XPU, etc. Although it may include any number of example cores 1102 (e.g., 1 core), the processor circuitry 1100 of this example is a multi-core semiconductor device including N cores. The cores 1102 of the processor circuitry 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all the machine-readable instructions and/or operations represented by the flowcharts of FIGS. 2 and 3.

The cores 1102 may communicate by an example bus 1104. In some examples, the bus 1104 may implement a communication bus to effectuate communication associated with one(s) of the cores 1102. For example, the bus 1104 may implement at least one of an Inter-Integrated Circuit (I2C) bus, a Serial Peripheral Interface (SPI) bus, a PCI bus, or a PCIe bus. Additionally or alternatively, the bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory (e.g., Level 1 (L1) cache 1120 that may be split into an L1 data cache and an L1 instruction cache), the processor circuitry 1100 also includes example shared memory 1110 that may be shared by the cores (e.g., Level 2 (L2_cache)) for high-speed access to data and/or instructions. Data and/or instructions may be transferred (e.g., shared) by writing to and/or reading from the shared memory 1110. The local memory of each of the cores 1102 and the shared memory 1110 may be part of a hierarchy of storage devices including multiple levels of cache memory and the main memory (e.g., the main memory 1014, 1016 of FIG. 4). Typically, higher levels of memory in the hierarchy exhibit lower access time and have smaller storage capacity than lower levels of memory. Changes in the various levels of the cache hierarchy are managed (e.g., coordinated) by a cache coherency policy.

One or more of the cores 1102 may be referred to as a CPU, DSP, GPU, etc., or any other type of hardware circuitry. Cores 1102 include control unit circuitry 1114, arithmetic and logic (AL) circuitry (sometimes referred to as an ALU) 1116, a plurality of registers 1118, the L1 cache 1120, and an example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer-based operations. In other examples, the AL circuitry 1116 also performs floating point operations. In yet other examples, the AL circuitry 1116 may include first AL circuitry that performs integer-based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 4. Alternatively, the registers 1118 may be organized in any other arrangement, format, or structure including distributed throughout the core 1102 to shorten access time. The bus 1122 may implement at least one of an I2C bus, a SPI bus, a PCI bus, or a PCIe bus.

Cores 1102 and/or, more generally, the processor circuitry 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The processor circuitry 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general-purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 6:
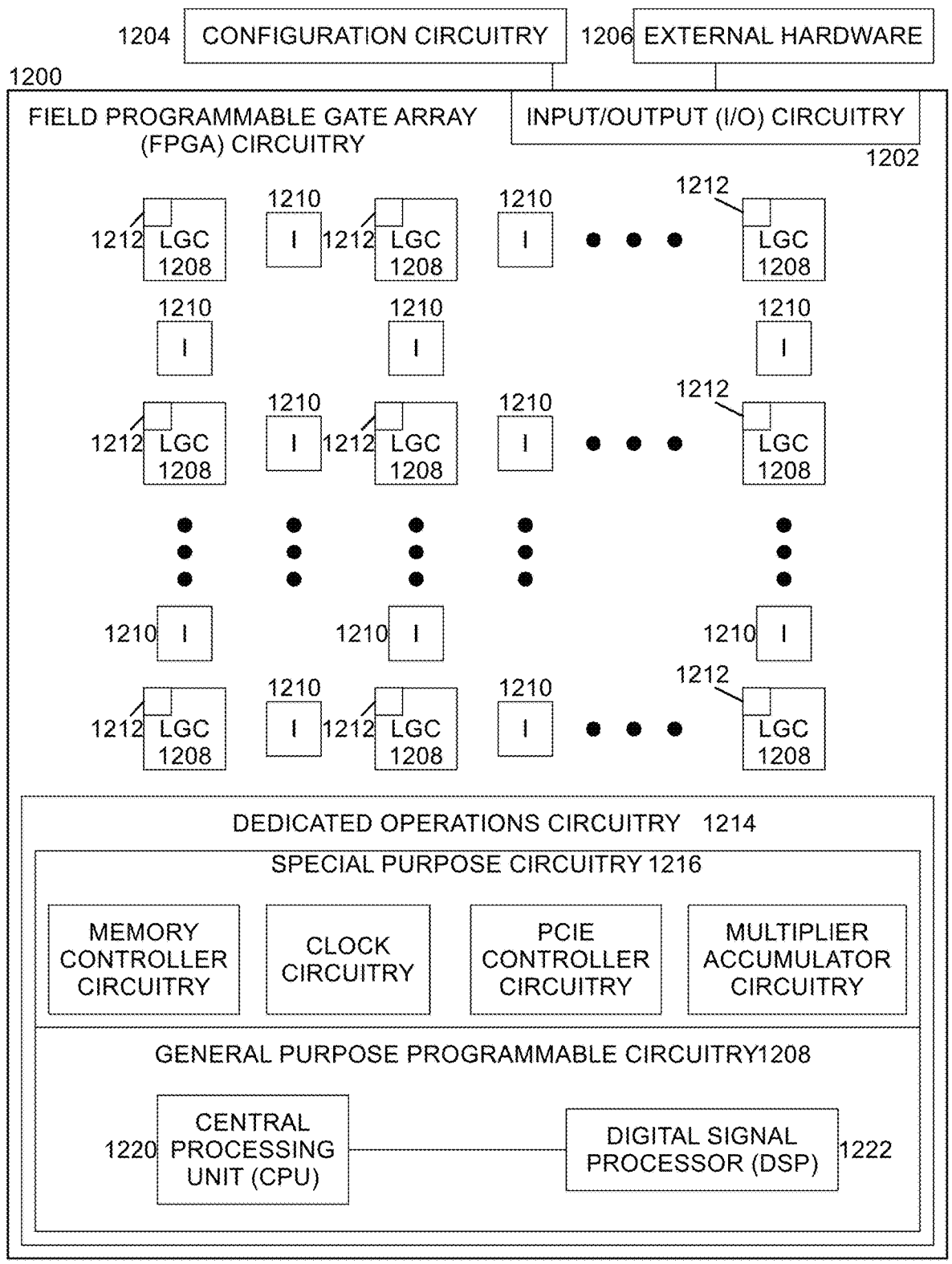
FIG. 6 is a block diagram of another example implementation of the processor circuitry of FIG. 4.

FIG. 6 is a block diagram of another example implementation of the processor circuitry 1012 of FIG. 4. In this example, the processor circuitry 1012 is implemented by FPGA circuitry 1200. The FPGA circuitry 1200 can be used, for example, to perform operations that could otherwise be performed by the example processor circuitry 1100 of FIG. 5 executing corresponding machine-readable instructions. However, once configured, the FPGA circuitry 1200 instantiates the machine-readable instructions in hardware and, thus, can often execute the operations faster than they could be performed by a general-purpose microprocessor executing the corresponding software.

More specifically, in contrast to the processor circuitry 1100 of FIG. 5 described above (which is a general purpose device that may be programmed to execute some or all of the machine readable instructions represented by the flowcharts of FIGS. 2 and 3 but whose interconnections and logic circuitry are fixed once fabricated), the FPGA circuitry 1200 of the example of FIG. 6 includes interconnections and logic circuitry that may be configured and/or interconnected in different ways after fabrication to instantiate, for example, some or all of the machine readable instructions represented by the flowcharts of FIGS. 2 and 3. In particular, the FPGA circuitry 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 2 and 3. As such, the FPGA circuitry 1200 may be structured to effectively instantiate some or all of the machine-readable instructions of the flowcharts of FIGS. 2 and 3 as dedicated logic circuits to perform the operations corresponding to those software instructions in a dedicated manner analogous to an ASIC. Therefore, the FPGA circuitry 1200 may perform the operations corresponding to the some or all of the machine-readable instructions of FIGS. 2 and 3 faster than the general-purpose microprocessor can execute the same.

In the example of FIG. 6, the FPGA circuitry 1200 is structured to be programmed (and/or reprogrammed one or more times) by an end user by a hardware description language (HDL) such as Verilog. The FPGA circuitry 1200 of FIG. 6, includes example input/output (I/O) circuitry 1202 to obtain and/or output data to/from example configuration circuitry 1204 and/or external hardware (e.g., external hardware circuitry) 1206. For example, the configuration circuitry 1204 may implement interface circuitry that may obtain machine readable instructions to configure the FPGA circuitry 1200, or portion(s) thereof. In some such examples, the configuration circuitry 1204 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may implement the processor circuitry 1100 of FIG. 5. The FPGA circuitry 1200 also includes an array of example logic gate circuitry 1208, a plurality of example configurable interconnections 1210, and example storage circuitry 1212. The logic gate circuitry 1208 and interconnections 1210 are configurable to instantiate one or more operations that may correspond to at least some of the machine-readable instructions of FIGS. 2 and 3 and/or other desired operations. The logic gate circuitry 1208 shown in FIG. 6 is fabricated in groups or blocks. Each block includes semiconductor-based electrical structures that may be configured into logic circuits. In some examples, the electrical structures include logic gates (e.g., AND gates, OR gates, NOR gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 6 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 5 and 6 illustrate two example implementations of the processor circuitry 1012 of FIG. 4, many other approaches are contemplated. For example, as mentioned above, modern FPGA circuitry may include an on-board CPU, such as one or more of the example CPU 1220 of FIG. 6. Therefore, the processor circuitry 1012 of FIG. 4 may additionally be implemented by combining the example processor circuitry 1100 of FIG. 4 and the example FPGA circuitry 1200 of FIG. 6. In some such hybrid examples, a first portion of the machine-readable instructions represented by the flowcharts of FIGS. 2 and 3 may be executed by one or more of the cores 1102 of FIG. 5 and a second portion of the machine-readable instructions represented by the flowcharts of FIGS. 2 and 3 may be executed by the FPGA circuitry 1200 of FIG. 6.

In some examples, the processor circuitry 1012 of FIG. 4 may be in one or more packages. For example, the processor circuitry 1100 of FIG. 5 and/or the FPGA circuitry 1200 of FIG. 6 may be in one or more packages. In some examples, an XPU may be implemented by the processor circuitry 1012 of FIG. 4, which may be in one or more packages. For example, the XPU may include a CPU in one package, a DSP in another package, a GPU in yet another package, and an FPGA in still yet another package.

Figure 7:
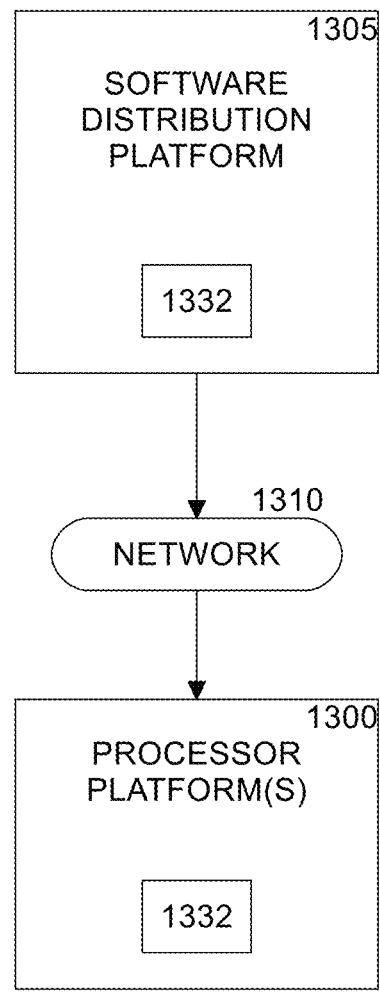
FIG. 7 is a block diagram illustrating an example software distribution platform to distribute software such as the machine-readable instructions and/or operations of FIGS. 2 and 3 to hardware devices owned and/or operated by third parties.

A block diagram illustrating an example software distribution platform 1305 to distribute software such as the example machine-readable instructions 1032 of FIG. 4 to hardware devices owned and/or operated by third parties is illustrated in FIG. 7. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine-readable instructions 1032 of FIG. 4. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine-readable instructions 1032, which may correspond to the example machine readable instructions of FIGS. 2 and 3, as described above. The one or more servers of the example software distribution platform 1305 are in communication with a network 1310, which may correspond to any one or more of the Internet and/or any of the example networks, etc., described above. In some examples, the one or more servers are responsive to requests to transmit the software to a requesting party as part of a commercial transaction. Payment for the delivery, sale, and/or license of the software may be handled by the one or more servers of the software distribution platform and/or by a third-party payment entity. The servers enable purchasers and/or licensors to download the machine-readable instructions 1032 from the software distribution platform 1305. For example, the software, which may correspond to the example machine readable instructions of FIGS. 2 and 3, may be downloaded to the example processor platform 1000, which is to execute the machine-readable instructions 1032 to implement the methods of FIGS. 2 and 3 and associated computing arrangement 100. In some examples, one or more servers of the software distribution platform 1305 periodically offer, transmit, and/or force updates to the software (e.g., the example machine-readable instructions 1032 of FIG. 4) to ensure improvements, patches, updates, etc., are distributed and applied to the software at the end user devices.

In some examples, an apparatus includes means for processing an operating state of an endpoint device circuitry based on operating data of the endpoint device circuitry to evaluate suitability of the endpoint device circuitry for an update. For example, the means for processing may be implemented by processor circuitry, processor circuitry, firmware circuitry, etc. In some examples, the processor circuitry may be implemented by machine executable instructions such as that implemented by at least blocks of FIGS. 2 and 3 executed by processor circuitry, which may be implemented by the example processor circuitry 1012 of FIG. 4, the example processor circuitry 1100 of FIG. 5, and/or the example Field Programmable Gate Array (FPGA) circuitry 1200 of FIG. 6. In other examples, the processor circuitry is implemented by other hardware logic circuitry, hardware implemented state machines, and/or any other combination of hardware, software, and/or firmware. For example, the processor circuitry may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, an apparatus includes means for using a phone as an audio device for a computing system running a video conferencing application. For example, the means for determining may be implemented by circuitry, etc. In some examples, the circuitry may be implemented by machine executable instructions such as that implemented by at least blocks of FIGS. 2 and 3 executed by processor circuitry, which may be implemented by the example processor circuitry 1012 of FIG. 4, the example processor circuitry 1100 of FIG. 5, and/or the example Field Programmable Gate Array (FPGA) circuitry 1200 of FIG. 6, executing in conjunction with memory 1014 and 1016. In other examples, the circuitry is implemented by other hardware logic circuitry, hardware implemented state machines, and/ or any other combination of hardware, software, and/or firmware. For example, the circuitry may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

From the foregoing, it will be appreciated that example systems, methods, apparatus, and articles of manufacture have been disclosed to improve operation of a phone being used as an audio device coupled to a computing system running a video conferencing application. The disclosed systems, methods, apparatus, and articles of manufacture improve the efficiency of using a computing device while running a video conferencing application. The disclosed systems, methods, apparatus, and articles of manufacture are accordingly directed to one or more improvement(s) in the operation of a machine such as a computer or other electronic and/or mechanical device.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the examples of this patent.

What is claimed is:

1. A method comprising:
    using a computing system in communication with a phone to notify the phone that the phone has been selected as an audio output device by an application running on the computing system;

receiving, by the phone, audio data from the application during a conferencing session; and using an audio manager (a) simultaneously allowing a user to answer an incoming phone call while pausing the sending of the audio data from the application to the phone when the user answers the incoming phone call, (b) sending audio data from the incoming phone call to the audio output device, and (c) automatically resuming the sending of the audio data from the application to the phone when the incoming phone call is disconnected.

2. The method of claim 1, wherein the application is one of a video conferencing application and a music application.

3. The method of claim 1, wherein the audio manager is further configured to detect an incoming phone call to the phone and automatically handle the incoming phone call, based at least in part on one or more preferences of a user of the phone, while receiving the audio data from the application and sending the audio data to the phone, wherein the automatically handling of the incoming phone call comprises sending the incoming phone call to voice mail when a "do not disturb" preference is set.

4. The method of claim 3, wherein the automatically handling the phone call optionally comprises call forwarding the incoming phone call to a designated call forwarding destination when a call forwarding preference is set.

5. The method of claim 3, wherein the automatically handling the phone call comprises the phone displaying an identification of a caller of the incoming phone call on a display of the phone but not playing a ring sound when a silent alert preference is set.

6. The method of claim 1, wherein the receiving, by the phone, audio data from the application comprises automatically enabling one or more user preferences of (a) "do not disturb", (b) call forwarding, and (c) silent alert of the incoming phone call while receiving audio data from the application.

7. The method of claim 1, further comprising the step of detecting an incoming instant message to the phone and automatically handling the incoming instant message by displaying a caller identification of a sender of the incoming instant message on a display of the phone but not playing a text arrival sound when a silent alert preference is set, while receiving the audio data from the application.

8. At least one non-transitory machine-readable storage medium comprising instructions that, when executed, cause at least one processing device to at least:
  receive, by a phone having an audio output device coupled thereto, audio data from an application running on a computing system coupled to the phone;
  detect an incoming phone call to the phone by an audio manager automatically handling the incoming phone call, based at least in part on one or more preferences of a user of the phone, while receiving the audio data from the application and sending the audio data to the audio output device; and
  the audio manager (a) simultaneously allowing the user to answer the incoming phone call and automatically pausing the sending of the audio data from the application to the phone when the user answers the incoming phone call, (b) sending audio data from the incoming phone call to the phone, and (c) automatically resuming sending of the audio data from the application to the phone when the incoming phone call is disconnected.

9. The at least one non-transitory machine-readable storage medium of claim 8, wherein the instructions to for automatically handling the incoming phone call comprise sending the incoming phone call to voice mail when a "do not disturb" preference is set.

10. The at least one non-transitory machine-readable storage medium of claim 8, wherein the instructions for automatically handling the incoming phone call comprise forwarding the incoming phone call to a designated call forwarding destination when a call forwarding preference is set.

11. The at least one non-transitory machine-readable storage medium of claim 8, wherein the instructions to automatically handle the incoming phone call comprises comprise displaying an identification of a caller of the incoming phone call on a display of the phone but not playing a ringtone when a silent alert preference is set.

12. The at least one non-transitory machine-readable storage medium of claim 8, wherein the instructions to receive, by the phone, audio data from the application comprise automatically enabling one or more user preferences of (a) "do not disturb", (b) call forwarding, and (c) silent alert while receiving audio data from the application and sending the audio data to the audio output device.

13. A phone comprising:
  an audio output device; and
  an audio manager configured to receive audio data from an application running on a computing system coupled to the phone, and to send the audio data to the audio output device;
  wherein the audio manger is further configured to detect an incoming phone call and to automatically handle the incoming phone call, based at least in part on one or more preferences of a user of the phone, while receiving the audio data from the application and sending the audio data to the audio output device; and
  wherein the audio manager is further configured to (a) simultaneously allow the user to answer the incoming phone call and automatically pause the sending of the audio data from the application running on the computing system to the audio output device when the user answers the phone call, (b) send audio data from the incoming phone call to the audio output device when the user answers the phone call, and (c) automatically resume sending of the audio data from the application to the audio output device when the incoming phone call is disconnected.

14. The phone of claim 13, wherein the application is one of a video conferencing application and a music application.

15. The phone of claim 13, wherein the automatically handling of the incoming phone call comprises the audio manager sending the incoming phone call to voice mail when a "do not disturb" preference is set.

16. The phone of claim 13, wherein the automatically handling of the incoming phone call comprises the audio manager forwarding the incoming phone call to a designated call forwarding destination when a call forwarding preference is set.

17. The phone of claim 13, wherein the automatically handling of the incoming phone call comprises the audio manager displaying an identification of a caller of the incoming phone call on a display of the phone but not playing a ring sound when a silent alert preference is set.

18. The method of claim 1, wherein the audio manager deactivates the automatic handling when the conferencing session concludes.

19. The method of claim 1, wherein the pausing of the sending of the audio data from the application to the phone comprises one of (a) placing the conferencing session on hold, (b) muting the conferencing session, or (c) discontinuing the sending the conferencing session audio to the phone.

20. The method of claim 1, wherein the audio manager is resident on the phone.

\* \* \* \* \*